United States Patent
Matsakis et al.

(10) Patent No.: US 9,298,784 B1
(45) Date of Patent: Mar. 29, 2016

(54) SEARCHING INSIDE ITEMS

(75) Inventors: Nicholas E. Matsakis, Redwood City, CA (US); Sonja E. Hyde-Moyer, Redwood City, CA (US); Sunil Ramesh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 238 days.

(21) Appl. No.: 13/550,819

(22) Filed: Jul. 17, 2012

(51) Int. Cl.
*G06F 7/00* (2006.01)
*G06F 17/30* (2006.01)

(52) U.S. Cl.
CPC .............................. *G06F 17/30554* (2013.01)

(58) Field of Classification Search
CPC ............... G06F 17/30864; G06F 17/30648; G06F 17/30896
USPC ................................................. 707/705–788
See application file for complete search history.

(56) References Cited

U.S. PATENT DOCUMENTS

| | | | |
|---|---|---|---|
| 7,953,730 B1 * | 5/2011 | Bleckner et al. | 707/722 |
| 8,341,146 B1 * | 12/2012 | Bleckner et al. | 707/722 |
| 8,352,449 B1 * | 1/2013 | Parekh et al. | 707/705 |
| 8,626,607 B1 * | 1/2014 | Wood et al. | 705/26.7 |
| 8,798,366 B1 * | 8/2014 | Jones et al. | 382/177 |
| 2003/0028889 A1 * | 2/2003 | McCoskey et al. | 725/91 |
| 2005/0071249 A1 * | 3/2005 | Nix et al. | 705/26 |
| 2009/0106037 A1 * | 4/2009 | Harindranath | 705/1 |
| 2010/0153427 A1 * | 6/2010 | Schechter et al. | 707/768 |
| 2012/0047534 A1 * | 2/2012 | Gharachorloo et al. | 725/53 |
| 2013/0179823 A1 * | 7/2013 | Batarseh et al. | 715/776 |
| 2013/0185198 A1 * | 7/2013 | Lorch | 705/39 |

* cited by examiner

*Primary Examiner* — Taelor Kim
(74) *Attorney, Agent, or Firm* — Thomas | Horstemeyer, LLP

(57) ABSTRACT

Disclosed are various embodiments for facilitating a search of published works, non-published works, and/or other works using both visual and text search elements. Upon receipt of an image, the search engine application determines whether the item depicted in the image includes searchable content. Once the search engine application determines that the item depicted in the image contains searchable content, the search engine application facilitates receipt of the search string that may be used to search the searchable content of the item. The search engine application may generate one or more search results in response to the search.

18 Claims, 7 Drawing Sheets

SEARCHING INSIDE ITEMS

BACKGROUND

Search engines are designed to help users to search for information. General-purpose search engines facilitate searches over the Web. Specialized search engines facilitate searches over private databases. Site-specific engines refer to search engines that many sites make available to search their own material.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to implementing a search containing both visual and text search elements. Various embodiments of the present disclosure facilitate a search of published works, non-published works, and/or other works using both visual and text search elements. For example, in some embodiments, a computing device such as a server may execute the search engine application. A user manipulates a client to interact with the search engine application by sending an image or image features to the search engine application. The image may depict an item, such as, for example, a book, a magazine, a journal, a dvd, and/or any other item. For example, a user may take a picture of an item using a camera, mobile phone, and/or other device and send the image to the search engine application. The search engine application may then perform a visual search and generate visual search results indicating potential matches of one or more of the items depicted in the image. The search engine application then encodes one or more of the visual search results for rendering for display and transmits the same for viewing. The search engine application may then generate a user interface to solicit a selection of one of the visual search results from the user. Upon receipt of the selected visual search result, the search engine application determines whether the item depicted in the selected visual search result includes searchable content. Once the search engine application determines that the item contains searchable content, the search engine application facilitates receipt of a search string from the user that may be used to search the searchable content of the item. The search engine application may generate one or more search results in response to the search. The search engine application then encodes one or more of the results for rendering for display and transmits one or more of the results for viewing. In the following discussion, a general description of the system and its components is provided, followed by a discussion of the operation of the same.

Figure 1:
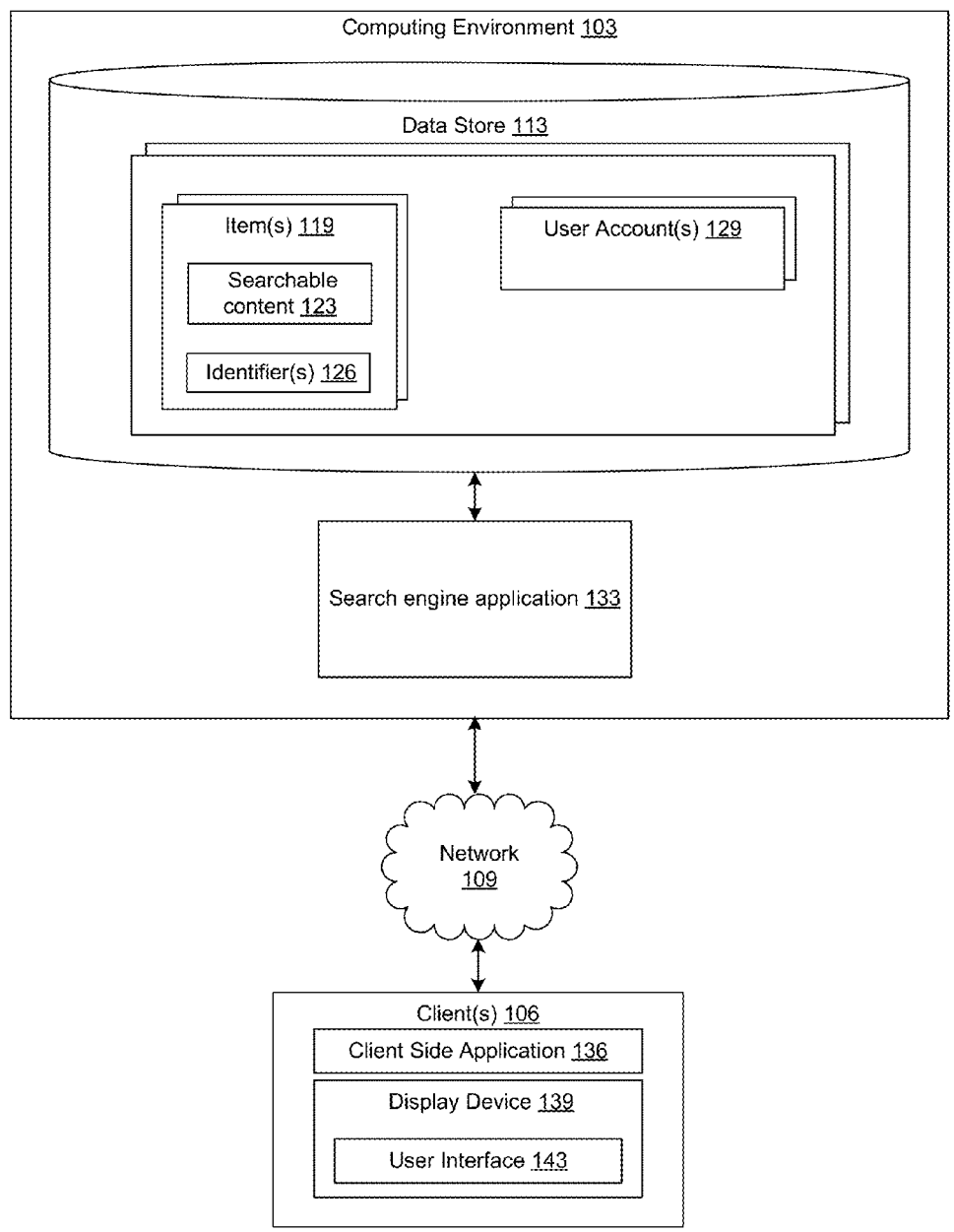
FIG. 1 is a drawing of networked environment according to various embodiments of the present disclosure.

With reference to FIG. 1, shown is a networked environment 100 according to various embodiments. The networked environment 100 includes a computing environment 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that may be employed that are arranged, for example, in one or more server banks or computer banks or other arrangements. For example, the computing environment 103 may comprise a cloud computing resource, a grid computing resource, and/or any other distributed computing arrangement. Such a computing environment 103 may be located in a single installation or may be distributed among many different geographical locations.

Various applications and/or other functionality may be executed in the computing environment 103 according to various embodiments. In addition, various data is stored in a data store 113 that is accessible to the computing environment 103. The data store 113 may be representative of a plurality of data stores as can be appreciated. The data stored in the data store 113, for example, is associated with the operation of the various applications and/or functional entities described below.

The components executed on the computing environment, for example, include a search engine application 133 and other applications, services, processes, systems, engines, or functionality not discussed in detail herein. The search engine application 133 facilitates processing of search queries submitted by users as well as indexing the content that forms a corpus of information against which search queries are executed in order to identify items that are relevant to a search string submitted by a user. It is understood, however, that there are many ways to structure such functionality. In some embodiments, for example, the search engine application 133 may be a standalone application that is executed on a standalone computing environment 103. The search engine application 133 is executed to generate a pool of items matching one or more search criteria, such as a search string that may include images and keyword search elements.

The search engine application 133 may be executed to facilitate the search of published works, non-published works, and/or other works using visual and text search elements. The search engine application 133 may communicate with the client 106 over various protocols such as, for example, hypertext transfer protocol (HTTP), simple object access protocol (SOAP), user datagram protocol (UDP), transmission control protocol (TCP), and/or other protocols for communicating data over the network 109.

The data stored in the data store 113 includes, for example, items 119, identifiers 126, searchable content 123, user accounts 129, and potentially other data. Items 119 may include books, magazines, journals, dvds, videos, products, and/or other items that may be depicted in an image. Identifiers 126 may serve as a mechanism to identify the edition of the item 119 that is depicted in the image. Items 119 can be associated with an identifier 126 that uniquely identifies the item among a corpus of items 119 such as other editions of the same published work.

Searchable content 123 may comprise text, graphics, reviews, previews, trailers, and/or other content capable of being indexed and searched that is associated with the item 119. User accounts 129 include data about a user of a client 106. Such user accounts 129 may include information such as usernames, passwords, security credentials, authorized applications, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, a cellular telephone, web pads, tablet computer systems, or other devices with like capability.

The client 106 may include a display device 139 and may include one or more input devices. Such input devices may be keyboards, mice, touch pads, touch sticks, push buttons, optical sensors, microphones, webcams, and/or any other device that can provide user input.

The client 106 is employed to execute a client side application 136 and/or other applications. The client side application 136 is executed in a client 106, for example, to access and render network pages, such as web pages, or other network content served up by the computing environment 103 and/or other servers. In this respect, the client side application 136 may comprise a browser, a dedicated application, or other applications. In one embodiment, the client side application 136 may comprise a plug-in within a browser application.

The client 106 may be configured to execute applications beyond client side application 136 such as, for example, email applications, instant message applications, and/or other applications. When executed, the client side application 136 renders one or more user interfaces 143 on a display device 139 of the client 106 in order to enable a user that manipulates such client 106 to interact with the search engine application 133 as will be described.

Next, a general description of the operation of the various components of the networked environment 100 is provided. To begin, a user employing a client 106 interacts with the search engine application 133 by sending an image or features of an image depicting an item 119 to the search engine application 133. As an example, a user may employ a camera, a mobile device, and/or other device to capture an image of an item 119 and send the image to the search engine application 133. Upon receipt of the image, the search engine application 133 performs a visual search based on one or more items 119 depicted in the image and generates one or more visual search results potentially matching one or more of the items 119 depicted in the image. The search engine application 133 may determine a display order of the visual search results based at least in part on sales ranking, browse history, and/or any other information relating to the items 119 depicted in the visual search results. The search engine application 133 then encodes for display a user interface 143 that depicts one or more of the visual search results. Also, the user interface 143 is configured to solicit a selection of one of the visual search results from the user. The user interface 143 is sent to the client 106. Upon receipt of a selected visual search result from the client, the search engine application 133 determines whether the item 119 depicted in the selected visual search result includes searchable content 123 such as, for example, text, graphics, reviews, previews, trailers, and/or other content capable of being indexed and searched. For example, if the item 119 comprises a published work that includes searchable content 123 and has been correctly identified by the search engine application 133, then the search engine application 133 may return an identifier 126 for the published work that is depicted in the image.

In some embodiments, there may be multiple items 119 depicted in the image. Assuming that the item 119 depicted in the image can be identified, the search engine application 133 may return an identifier 126 associated with the item 119. In one embodiment, the identifier 126 may serve as a mechanism to identify the edition of the item 119 that is depicted in the image.

Assuming that the search engine application 133 has determined that the item 119 includes searchable content 123, the search engine application 133 generates a user interface 143 such as a network page or other content and sends the same to the client 106. In one embodiment, the user interface 143 includes a search form that facilitates entry of a search string by the user of the client 106.

Accordingly, when a user submits a search string via the form, the search engine application 133 executes a search of the previously identified searchable item 119 with the submitted search string to identify relevant search results in the searchable content 123 of the item 119. Alternatively, the search string may be extracted from the image. Upon receipt or extraction of the search string, the search engine application 133 facilitates a search of the searchable content 123 of the respective item 119, thereby generating one or more search results.

The search engine application 133 then ranks the search results according to a measure of relevancy to the search string. Accordingly, the search results generated by such a search can be ranked by the search engine application 133 using a predefined ranking algorithm. The search results are presented in a user interface 143 that is served up to the client 106 and rendered for the user. Search results may include, for example, page numbers of pages a publication that contains elements of the search string, excerpts or portions of text, and/or other portions of the searchable content 123.

The search engine application 133 stores the search string and the search results in association with a user account 129. In one embodiment, the search engine application 133 tracks the number of times the searchable content 123 associated with an item 119 is searched. In another embodiment, the search engine application 133 may track the number of times each of the search results is presented as a result of a search. In yet another embodiment, the search engine application 133 may track the number of times a particular search string is submitted in association with a search with respect to a given item 119.

Figure 2A:
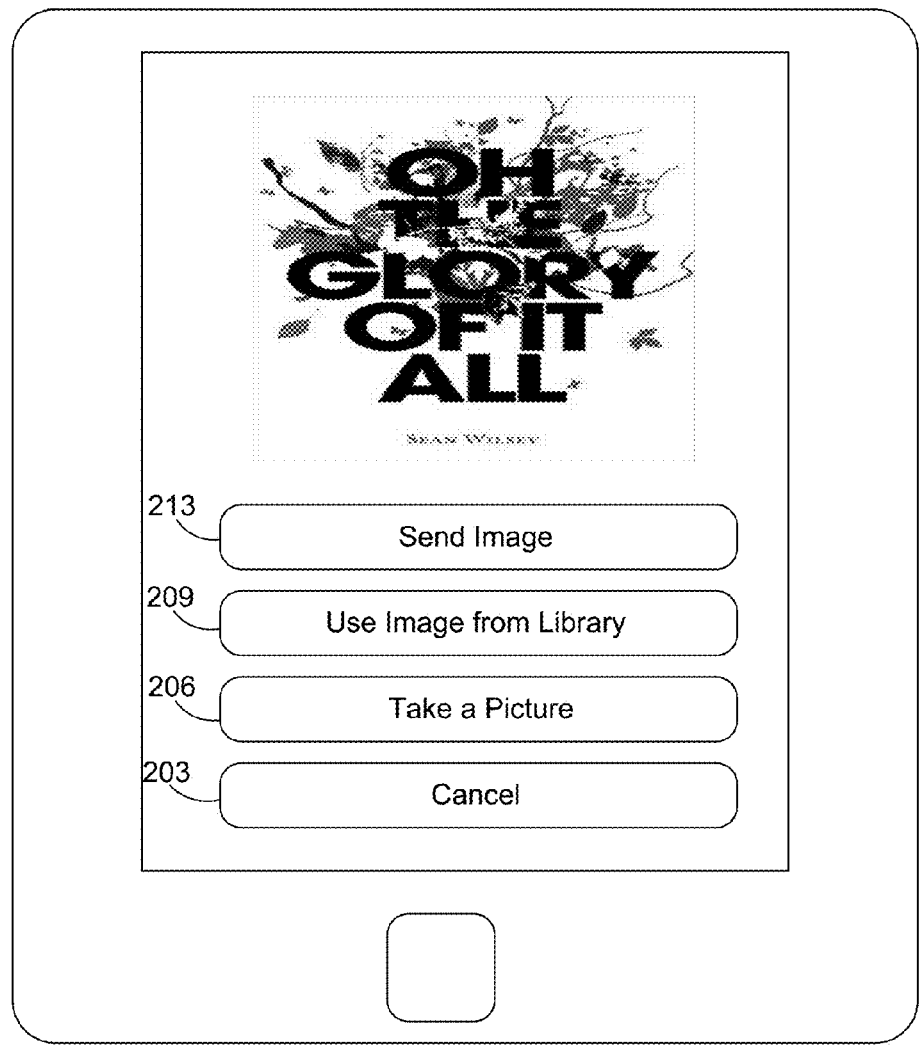
FIGS. 2A-2D are drawings of examples of user interfaces rendered by a client in the networked environment of FIG. 1 according to various embodiments of the present disclosure.

Referring next to FIG. 2A, shown is one example of a client 106 (FIG. 1) that includes an example of a user interface 143 (FIG. 1), denoted herein as user interface 143a, according to various embodiments. The user interface 143a is rendered, for example, on a display device 139 (FIG. 1) associated with a respective client 106 by a client side application 136 (FIG. 1). In one embodiment, in order to manipulate the components of the user interface 143a, a user may "click" one of the components depicted in the user interface 143a by touching a given component, positioning a cursor over a given component and manipulating a button on a mouse associated with the client 106, and/or by using other approaches to manipulate the various buttons, icons, or other components of the user interface 143a as can be appreciated.

For example, a user may interact with the user interface 143a in order to capture or select an image depicting a item 119 to be sent to the search engine application 133 (FIG. 1). In one embodiment, a user may capture an image by "clicking" the "take a picture" button 206. Alternatively, a user may select an image by "clicking" the "use image from library" button 209 in order to choose an existing image from a library of images that may be stored on the client 106. For example, the search engine application 133 may generate one or more user interfaces 143*a* that may be used to facilitate the selection of an image. Alternatively, other approaches may be employed by a user to capture images. A user may send an image to the search engine application 133 by "clicking" the "send image" button 213. Similarly, a user may cancel request to select an image by "clicking" the "cancel" button 203.

Figure 2B:
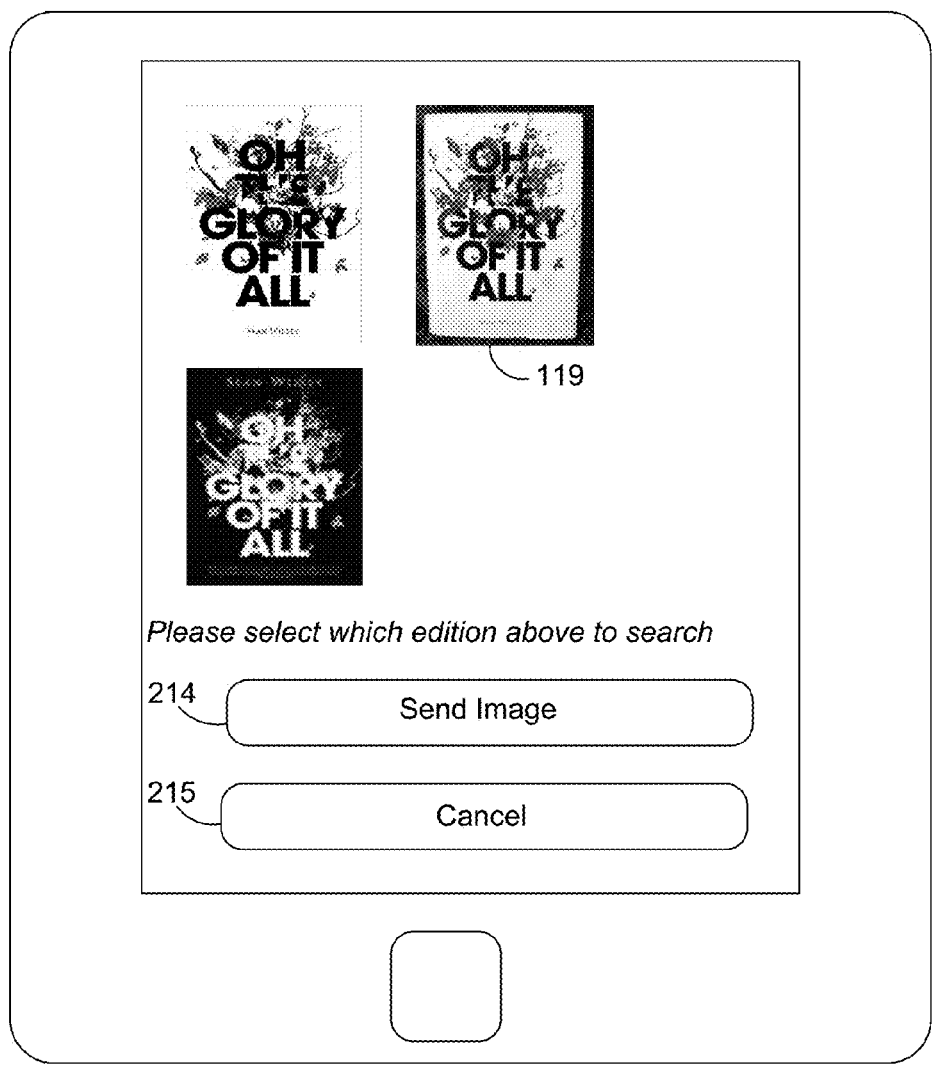

Referring next to FIG. 2B, shown is another example of a client 106 (FIG. 1) that includes another example of a user interface 143 (FIG. 1), denoted herein as user interface 143*b*, according to various embodiments. The user interface 143*b* is rendered, for example, on a display device 139 (FIG. 1) associated with a respective client 106 by the client side application 136 (FIG. 1). The user interface 143*b* presents visual search results for an item 119 in cases where multiple items 119 may potentially match the item depicted in the image generated by the user. The user interface 143*b* facilitates selection of one of the items 119 depicted for which a textual search is to be performed as will be described. In one embodiment, in order to manipulate the components of the user interface 143*b*, a user may "click" one of the components depicted in the user interface 143*b* by touching a given component, positioning a cursor over a given component and manipulating a button on a mouse associated with the client 106, and/or by using other approaches to manipulate the various buttons, icons, or other components of the user interface 143*b* as can be appreciated.

Upon receipt of the image, the search engine application 133 (FIG. 1) performs a visual search based on the item 119 depicted in the image and generates one or more visual search results potentially matching one or more of the items 119 depicted in the image. The search engine application 133 may determine a display order of the visual search results based at least in part on sales ranking, browse history, and/or any other information. The visual search results are presented in the user interface 143*b* that is served up to the client 106 and rendered for the user. Visual search results may include, for example, multiple editions of the same published work, multiple items 119 with the same cover art, and/or other visual search results. A user may click on one of the items 119 to highlight such item 119. Thereafter, the user may click on the send image button 214 to send their selection of one of the items 119 to the search engine application 133 to determine whether such item 119 is searchable. In addition, the user interface 143*b* includes a cancel button 215 that the user may click to cancel the transaction.

Figure 2C:
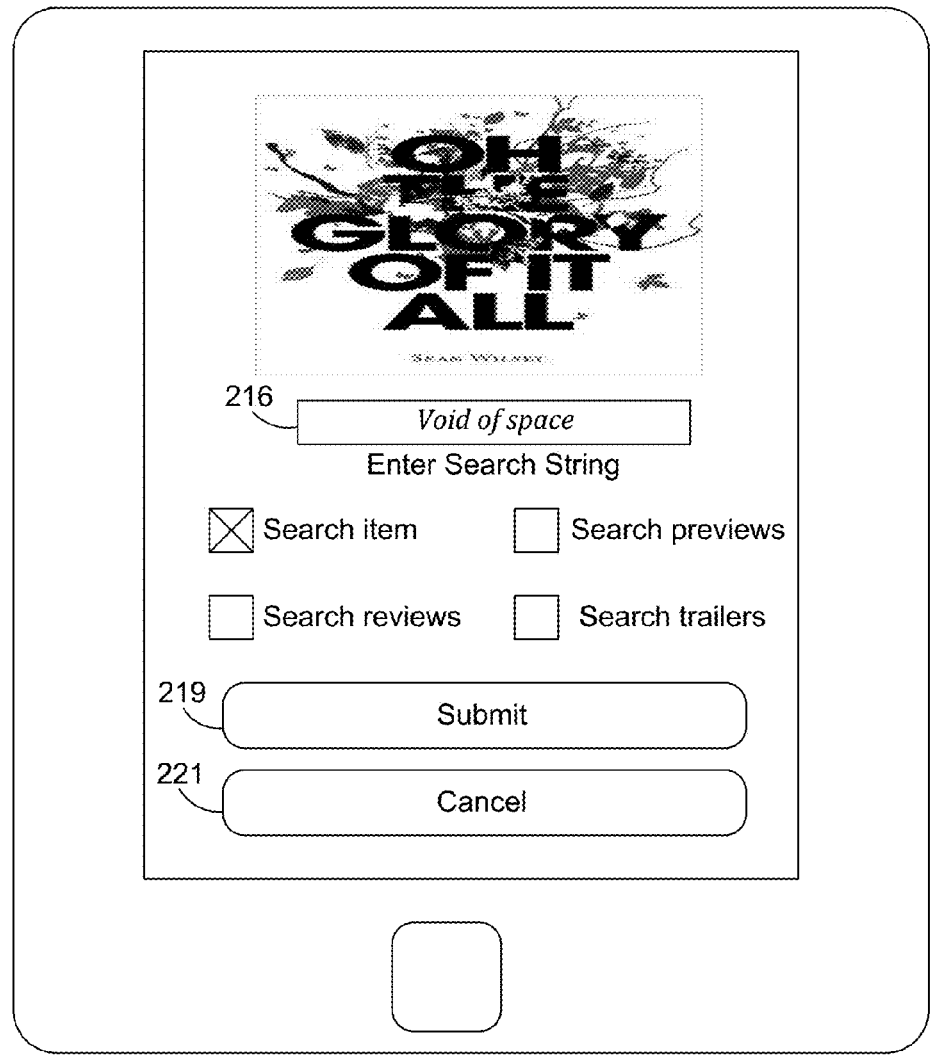

Turning now to FIG. 2C, shown is another example of a client 106 (FIG. 1) that includes another example of a user interface 143, denoted herein as user interface 143*c*, according to various embodiments. The user interface 143*c* is rendered, for example, on a display device 139 (FIG. 1) associated with a respective client 106 by the client side application 136 (FIG. 1). In one embodiment, in order to manipulate the components of the user interface 143*c*, a user may "click" one of the components depicted in the user interface 143*c* by touching a given component, positioning a cursor over a given component and manipulating a button on a mouse associated with the client 106, and/or by using other approaches to manipulate the various buttons, icons, or other components of the user interface 143*c* as can be appreciated.

Upon receipt of the selected visual search result sent by clicking the send image button 214 (FIG. 2B) above, the search engine application 133 determines whether the item 119 depicted in the selected visual search result includes searchable content 123 such as, for example, text, graphics, reviews, previews, trailers, and/or other content capable of being indexed and searched. Once the search engine application 133 (FIG. 1) has determined that the item 119 depicted in the image includes searchable content, the search engine application 133 generates the user interface 143*c* to solicit a search string along with a user specification of the searchable content 123 associated with the item 119 to be searched from a user of a client 106.

For example, the user interface 143 may include a search text box 216. In some embodiments, a user may manually input a search string into a search text box 216 by using a keyboard, touch pad, and/or other input device. In another embodiment, a user may enter a search string by using voice commands. In yet another embodiment, a search string may be extracted from the image received by the search engine application 133. Alternatively, other approaches may involve the selection of boxes and buttons in order to enter a search string. When a search string has been entered in a respective search text box 216 or has been provided in some other manner, a user may transmit the search string to the search engine application 133 by "clicking" the "submit" button 219. Accordingly, when a user submits a search string via the form, the search engine application 133 executes a search with the submitted search string to identify relevant search results of the specified searchable content 123 (FIG. 1) of the item 119 (FIG. 1). Alternatively, the user may click on the cancel button 221 to cancel the transaction.

Figure 2D:
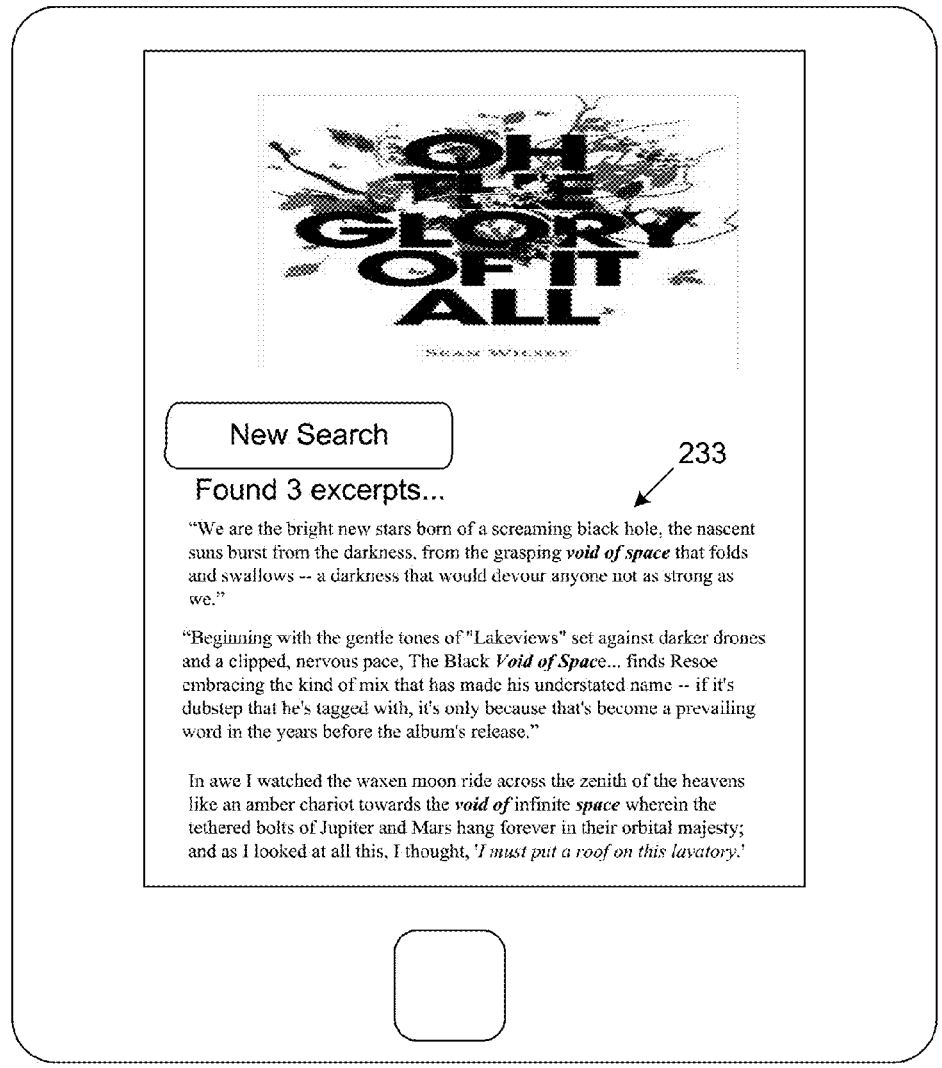

Moving on to FIG. 2D, shown is yet another example of a client 106 (FIG. 1) that includes yet another example of a user interface 143, denoted herein as user interface 143*d*, according to various embodiments. The user interface 143*d* is rendered, for example, on a display device 139 (FIG. 1) associated with a respective client 106 by the client side application 136 (FIG. 1) to depict results from the search of the searchable content specified above in the user interface 143*c*. In one embodiment, in order to manipulate the components of the search result user interface 143*d*, a user may "click" one of the components depicted in the user interface 143*d* by touching a given component, positioning a cursor over a given component and manipulating a button on a mouse associated with the client 106, and/or by using other approaches to manipulate the various buttons, icons, or other components of the search result user interface 143*d* as can be appreciated. The search result user interface 143*d* depicts the results of a search executed based on the search string by the search engine application 133 (FIG. 1). As shown in the example search result user interface 143*d*, the search string is "Void of Space."

By performing a search of the searchable content 123 (FIG. 1) using the search string, the search engine application 133 generates one or more search results 233. The search results 233 may include one or more excerpts of text, one or more page numbers of a publication containing elements of the search string, and/or other search results 233. The search engine application 133 may depict the search results 233 in a ranked order, where the search results 233 are ranked according to a measure of relevancy to the search string. Accordingly, the search results 233 generated by such a search can be ranked by the search engine application 133 according to a ranking algorithm that the search engine application 133 employs to rank search results 233. The ranking of the search results 233 may be based at least in part on the location of the keywords of the search string in the searchable content 123. For example, keywords that occur at the beginning of page, in titles of pages, and keywords of the search string that appear closer in proximity in relation to other words of a document may have a higher display order. As another example, search results 233 may be prioritized and displayed based on the page number of the item 119 on which the search result 233 appears. Alternatively, search results 233 may be prioritized based on how often the keywords of the search appear on a page or other portion of a document. Once the search engine application 133 determines the ranking order of the search results 233, the search engine application 133 encodes a user interface 143d that includes one or more of the search results 233 for display and transmits the same to the client 106.

Figure 3:
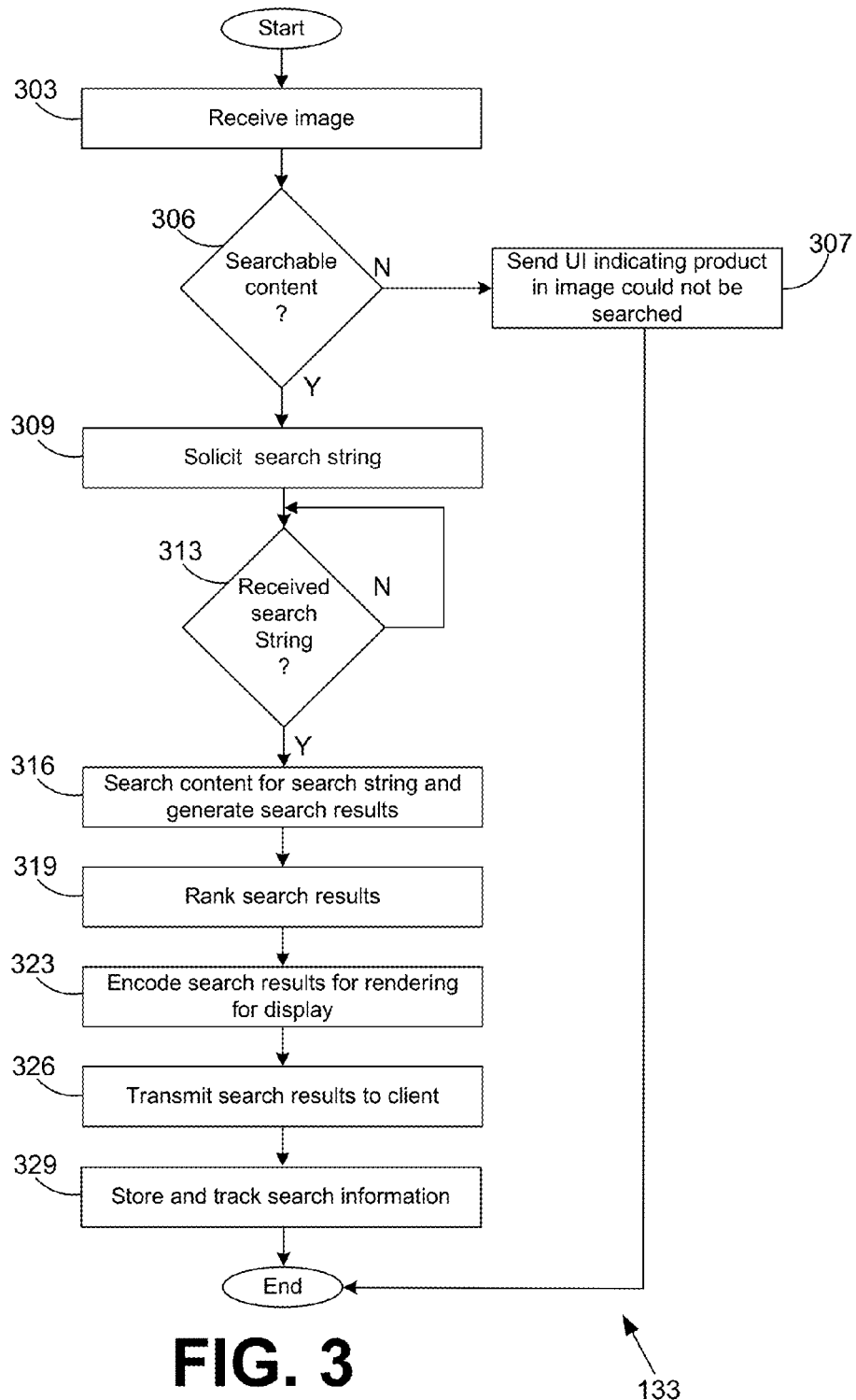
FIG. 3 is a flowchart illustrating one example of functionality implemented as portions of search engine application executed in a computing device in the networked environment of FIG. 1 according to various embodiments of the present disclosure.

Referring next to FIG. 3, shown is a flowchart that provides one example of the operation of a portion of the search engine application 133 according to various embodiments. It is understood that the flowchart of FIG. 3 provides merely an example of the many different types of functional arrangements that may be employed to implement the operation of the portion of the search engine application 133 as described herein. As an alternative, the flowchart of FIG. 3 may be viewed as depicting an example of steps of a method implemented in the computing environment 103 (FIG. 1) according to one or more embodiments.

Beginning with box 303, the search engine application 133 obtains an image from a client 106 (FIG. 1). The image may depict an item 119 (FIG. 1), such as, for example, a book, a magazine, a journal, a dvd, and/or any other item 119. The image may comprise a visual depiction of the item 119 generated by the user or selected by a user from visual search results as described above. Upon receipt of the image, the search engine application 133 moves to box 306 and determines whether the item 119 depicted in the image includes searchable content 123 (FIG. 1). This may be done, for example, by first implementing an image recognition system to determine which items 119 are depicted in the image. Next, the search engine application 133 determines whether searchable content 123 is stored in the data store 113 (FIG. 1) for the items 119. If there is no searchable content 123 associated with the items 119, the search engine application 133 proceeds to box 307 and returns a message to the client 106 that the item 119 could not be searched.

Assuming that the search engine application 133 determines that the item depicted in the image contains searchable content 123, the search engine application 133 proceeds to box 309 and facilitates receipt of the search string that may be used to search the searchable content 123 of the item 119. For example, the search engine application 133 may generate a user interface 143c (FIG. 2C) in the form of a network page or other content and send the same to the client 106. In one embodiment, the user interface 143c includes a search form that facilitates entry of a search string by the user of the client 106. For example, the user interface 143c may include a search text box 216 (FIG. 2C). In some embodiments, a user may manually input a search string into a search text box 216 by using a keyboard, touch pad, and/or other input device. In another embodiment, a user may enter a search string by using voice commands. In yet another embodiment, a search string may be extracted from the image received by the search engine application 133. Alternatively, other approaches may involve the selection of boxes and buttons in order to enter a search string. The search engine application 133 then proceeds to box 313 and determines whether a search string has been received.

Accordingly, when a user submits a search string, the search engine application 133 proceeds to box 316 and executes a search with the submitted search string to identify relevant search results in the searchable content 123 of the item 119. By performing the search, the search engine application 133 generates one or more search results 233 (FIG. 2D). The search results 233 may include one or more excerpts of text, one or more page numbers of a publication, and/or other search results 233.

The search engine application 133 then moves to box 319 and ranks the search results 233 according to a measure of relevancy to the search string. Accordingly, the search results 233 generated by such a search can be ranked by the search engine application 133 according to a ranking algorithm that the search engine application 133 employs to rank search results and includes in a search result user interface 143d. The ranking of the search results 233 may be based at least in part on the location of the keywords of the search string. For example, keywords that occur at the beginning of page, in titles of pages, and keywords of the search string that appear closer in proximity in relation to other words in a document may have a higher display order. As another example, search results 233 may be prioritized and displayed based on the page number of the item 119 on which the search result 233 appears. Alternatively, search results 233 may be prioritized based on how often the keywords of the search appear on a page of a document. Once the search engine application 133 determines the ranking order of the search results 233, the search engine application 133 proceeds to box 323 and encodes a user interface 143d that depicts one or more of the search results 233 for display. The search engine application 133 then proceeds to box 326 and transmits the search results 233 to the client 106. The search engine application then proceeds to box 329.

In box 329, the search engine application 133 stores the search string and the search results in association with a user account 129 (FIG. 1). In one embodiment, the search engine application 133 tracks the number of times the searchable content 123 associated with an item 119 is searched. In another embodiment, the search engine application 133 may track the number of times each of the search results 233 is presented as a result of a search. In yet another embodiment, the search engine application 133 may track the number of times a particular search string is submitted in association with a search with respect to a given item 119. In addition, other information relating to a search may be stored. Thereafter, the search engine application 133 ends.

Figure 4:
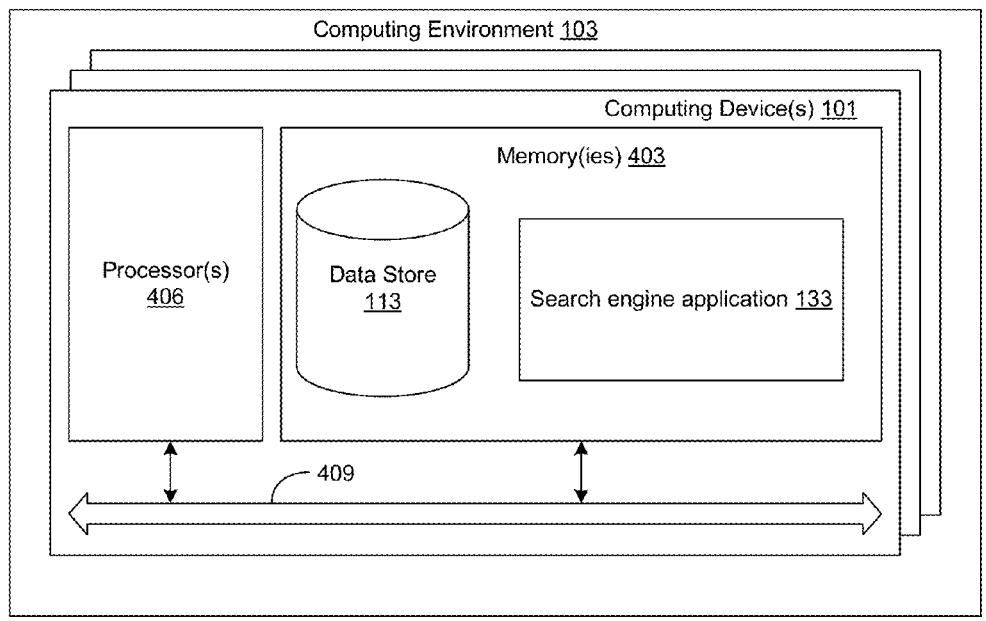
FIG. 4 is a schematic block diagram that provides one example illustration of a computing device employed in the networked environment of FIG. 1 according to various embodiments of the present disclosure.

With reference to FIG. 4, shown is a schematic block diagram of the computing environment 103 according to an embodiment of the present disclosure. The computing environment 103 includes at least one processor circuit, for example, having a processor 406 and a memory 403, both of which are coupled to a local interface 409. To this end, the computing environment 103 may comprise, for example, at least one server computer or like device. The local interface 409 may comprise, for example, a data bus with an accompanying address/control bus or other bus structure as can be appreciated.

Stored in the memory 403 are both data and several components that are executable by the processor 406. In particular, stored in the memory 403 and executable by the processor 406 are search engine application 133 and potentially other applications. Also stored in the memory 403 may be a data store 113 and other data. In addition, an operating system may be stored in the memory 403 and executable by the processor 406.

It is understood that there may be other applications that are stored in the memory 403 and are executable by the processors 406 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 403 and are executable by the processor 406. In this respect, the term "executable" means a program file that is in a form that can ultimately be run by the processor 406. Examples of executable programs may be, for example, a compiled program that can be translated into machine code in a format that can be loaded into a random access portion of the memory 403 and run by the processor 406, source code that may be expressed in proper format such as object code that is capable of being loaded into a random access portion of the memory 403 and executed by the processor 406, or source code that may be interpreted by another executable program to generate instructions in a random access portion of the memory 403 to be executed by the processor 406, etc. An executable program may be stored in any portion or component of the memory 403 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 403 is defined herein as including both volatile and nonvolatile memory and data storage components. Volatile components are those that do not retain data values upon loss of power. Nonvolatile components are those that retain data upon a loss of power. Thus, the memory 403 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 406 may represent multiple processors 406 and the memory 403 may represent multiple memories 403 that operate in parallel processing circuits, respectively. In such a case, the local interface 409 may be an appropriate network 109 (FIG. 1) that facilitates communication between any two of the multiple processors 406, between any processor 406 and any of the memories 403, or between any two of the memories 403, etc. The local interface 409 may comprise additional systems designed to coordinate this communication, including, for example, performing load balancing. The processor 406 may be of electrical or of some other available construction.

Although search engine application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the search engine application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 406 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including, that comprises software or code can be embodied in any non-transitory computer-readable medium for use by or in connection with an instruction execution system such as, for example, a processor 406 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s)

without departing substantially from the spirit and principles of the disclosure. All such modifications and variations are intended to be included herein within the scope of this disclosure and protected by the following claims.

Therefore, the following is claimed:

1. A non-transitory computer-readable medium comprising a plurality of computer instructions executable by a computing device, wherein upon execution, the plurality of computer instructions cause the computing device to at least:
- receive of an image from a client, wherein the image depicts a book;
- perform a first search of the book based at least in part upon the image, thereby generating a plurality of first search results from the first search to be rendered in a user interface;
- determine an edition of the book depicted in the image from a selection of at least one of the plurality of first search results rendered in the user interface;
- determine that the edition of the book includes a searchable content;
- facilitate a second search of the searchable content based at least in part upon on a search string entered via the user interface, thereby generating a plurality of second search results from the second search, wherein the search string is associated with at least one of a review of the book that includes the searchable content, a preview of the book that includes the searchable content, or a trailer associated with the book that includes the searchable content;
- track a number of times the image is received;
- track the number of times the search string is received;
- store the image, the search string, the plurality of first search results and the plurality of second search results in association with a user account;
- encode for rendering for display at least a subset of the plurality of second search results, wherein the subset of the plurality of second search results is displayed according to a ranking based at least in part on a location of keywords in the search string, wherein an individual one of the plurality of second search results containing keywords that appear closer in proximity in relation to other words in the individual one of the plurality of second search results is ranked higher than an individual ones of the plurality of second search results containing keywords that appear farther away in proximity in relation to other words in the individual one of the plurality of second search results; and
- store the individual one of the plurality of second search results in association with the user account.

2. The non-transitory computer-readable medium of claim 1, wherein the plurality of second search results comprise a plurality of excerpts of text.

3. The non-transitory computer-readable medium of claim 1, wherein the plurality of second search results comprise a plurality of page numbers of the book.

4. A system, comprising:
- at least one computing device; and
- a plurality of computer instructions executable by the at least one computing device, wherein when executed, cause the at least one computing device to at least:
  - receive an image from a client, wherein the image depicts a book;
  - perform a first search of the book based at least in part on the image, thereby generating a plurality of first search results from the first search to be rendered in a user interface;
  - determine an edition of the book depicted in the image from a selection of at least one of the plurality of first search results;
  - determine that the edition of the book includes a searchable content;
  - facilitate a second search of the searchable content based at least in part on a search string entered via the user interface, thereby generating a plurality of second search results, wherein the search string is associated with at least one of a review of the book that includes the searchable content, a preview of the book that includes the searchable content, or a trailer of the book that includes the searchable content;
  - track a number of times the image is received;
  - track the number of times the search string is received;
  - store the image, the search string, the plurality of first search results and the plurality of second search results in association with a user account;
  - encode for rendering for display at least a subset of the plurality of second search results, wherein the subset of the plurality of second search results is displayed according to a ranking based at least in part on a location of keywords in the search string, wherein an individual one of the plurality of second search results containing keywords that appear closer in proximity in relation to other words in the individual one of the plurality of second search results is ranked higher than an individual one of the plurality of second search results containing keywords that appear farther away in proximity in relation to other words in the individual one of the plurality of second search results; and
  - store the individual one of the plurality of second search results in association with the user account.

5. The system of claim 4, wherein the image is captured via a camera associated with a mobile device.

6. The system of claim 5, wherein each of the plurality of first search results is associated with an edition of the book.

7. The system of claim 6, wherein the plurality of computer instructions further cause the at least one computing device to at least track a number of times the edition of the book is selected.

8. The system of claim 4, wherein the plurality of second search results comprise a plurality of excerpts of text.

9. The system of claim 4, wherein the plurality of second search results comprise a plurality of page numbers of a publication.

10. The system of claim 4, wherein the plurality of computer instructions further causes the at least one computing device to determine a display order of the plurality of first search results.

11. The system of claim 10, wherein the display order is determined based at least in part on a sales ranking of the book.

12. The system of claim 4, wherein the client is selected from a group consisting of a camera and mobile device.

13. The system of claim 4, wherein the book is an audio book, the plurality of search results further comprising a plurality of timestamps, each of the timestamps corresponding to a particular point of the audio book.

14. A method, comprising:
- receiving, in a computing device, an image, wherein the image depicts a book;
- performing, in the computing device, a first search of the book based at least in part on the image, thereby generating a plurality of first search results to be rendered in a user interface;

determining, in the computing device, an edition of the book depicted in the image from a selection of at least one of the plurality of first search results rendered in the user interface;

determining, in the computing device, that the edition of the book at includes a searchable content;

facilitating, in the computing device, a second search of the searchable content based at least in part upon a search string entered via the user interface, thereby generating a plurality of second search results from the second search, wherein the search string is associated with at least one of a review of the book that includes the searchable content, a preview of the book that includes the searchable content, or a trailer associated with the book that includes the searchable content;

track a number of times the image is received;

track the number of times the search string is received;

store the image, the search string, the plurality of the first search results and the plurality of second search results in association with a user account;

encoding, in the computing device, at least a subset of the plurality of second search results for rendering for display, wherein the subset of the plurality of second search results is displayed according to a ranking based at least in part on a location of keywords in the search string, wherein an individual one of the plurality of second search results containing keywords that appear closer in proximity in relation to other words in the individual one of the plurality of second search results is ranked higher than an individual one of the plurality of second search results containing keywords that appear farther away in proximity in relation to other words in the individual one of the plurality of second search results; and store, in the computing device, the individual one of the plurality of second search results in association with the user account.

15. The method of claim 14, wherein the book is an audio book.

16. The method of claim 15, further comprising determining, in the computing device, an edition of the book based at least upon an input from a user.

17. The non-transitory computer-readable medium of claim 1, wherein the ranking is further based at least in part on a page number that the keywords appear on.

18. The non-transitory computer-readable medium of claim 1, wherein the client is selected from a group consisting of a camera and mobile device.

* * * * *